(12) United States Patent
Iwano et al.

(10) Patent No.: US 7,984,943 B2
(45) Date of Patent: Jul. 26, 2011

(54) VEHICULAR HOOD STRUCTURE

(75) Inventors: Yoshihiro Iwano, Toyota (JP);
Katsuyoshi Ito, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/866,207

(22) PCT Filed: Jan. 21, 2009

(86) PCT No.: PCT/JP2009/050865
§ 371 (c)(1),
(2), (4) Date: Aug. 4, 2010

(87) PCT Pub. No.: WO2009/098939
PCT Pub. Date: Aug. 13, 2009

(65) Prior Publication Data
US 2010/0314907 A1    Dec. 16, 2010

(30) Foreign Application Priority Data

Feb. 4, 2008    (JP) .................................. 2008-024152

(51) Int. Cl.
*B62D 25/10*    (2006.01)
(52) U.S. Cl. ................... 296/193.11; 296/187.04
(58) Field of Classification Search ............. 296/187.04, 296/187.09, 193.11; 180/69.2, 69.21; 292/DIG. 14
See application file for complete search history.

(56) References Cited

U.S. PATENT DOCUMENTS

| 7,055,894 | B2 * | 6/2006 | Ikeda et al. | 296/187.09 |
| 7,147,273 | B2 * | 12/2006 | Ikeda et al. | 296/193.11 |
| 7,481,488 | B2 * | 1/2009 | Ikeda et al. | 296/193.11 |
| 7,488,031 | B2 * | 2/2009 | Ishitobi | 296/193.11 |
| 7,810,877 | B2 * | 10/2010 | Ishitobi | 296/193.11 |
| 2005/0082874 | A1 * | 4/2005 | Ikeda et al. | 296/193.11 |
| 2006/0158007 | A1 * | 7/2006 | Seksaria et al. | 296/193.11 |
| 2006/0163915 | A1 * | 7/2006 | Ikeda et al. | 296/193.11 |
| 2006/0220418 | A1 * | 10/2006 | Behr et al. | 296/187.04 |
| 2008/0007094 | A1 * | 1/2008 | Ishitobi | 296/193.11 |
| 2008/0122261 | A1 * | 5/2008 | Seo | 296/193.11 |
| 2010/0140979 | A1 * | 6/2010 | Seksaria et al. | 296/193.11 |

FOREIGN PATENT DOCUMENTS

| JP | 2001 151159 | 6/2001 |
| JP | 2001 301659 | 10/2001 |
| JP | 2003 252246 | 9/2003 |

(Continued)

*Primary Examiner* — Glenn Dayoan
*Assistant Examiner* — Gregory Blankenship
(74) *Attorney, Agent, or Firm* — Oblon, Spivak, McClelland, Maier & Neustadt, L.L.P.

(57) ABSTRACT

A vehicular hood structure, which can generate more properly a load reaction to be inputted to a collision member, even if the collision member collides against the vicinity of an intermediate position between a hood general portion and a portion close to a hood front end edge so that a load acts to deform a hood inner panel of the hood general portion and a hood lock reinforce of a hood front end portion. A rear end portion of the hood lock reinforce is joined, at a leg extending to the hood back side at a portion spaced at a predetermined distance in the hood width direction, to a flat portion of the hood inner panel. In this hood inner panel, a crush bead is formed along the hood width direction at the substantially central portion of a skeleton portion in the hood length direction, and a small bead is formed at the substantially central portion of the flat portion in the hood width direction.

12 Claims, 8 Drawing Sheets

FOREIGN PATENT DOCUMENTS

| | | |
|---|---|---|
| JP | 2004 50909 | 2/2004 |
| JP | 2004 58973 | 2/2004 |
| JP | 2004 76065 | 3/2004 |
| JP | 2004 82796 | 3/2004 |
| JP | 2005 75163 | 3/2005 |
| JP | 2005 212510 | 8/2005 |
| JP | 2005 239092 | 9/2005 |
| JP | 2006 306237 | 11/2006 |
| JP | 2007 30693 | 2/2007 |
| JP | 2008 24185 | 2/2008 |
| JP | 2008 213037 | 9/2008 |
| JP | 2009 90934 | 4/2009 |
| JP | 2009 192119 | 8/2009 |

* cited by examiner

VEHICULAR HOOD STRUCTURE

TECHNICAL FIELD

The present invention relates to a vehicular hood structure in which a hood lock reinforce is disposed between a hood outer panel and a hood inner panel at a hood front end portion.

BACKGROUND ART

Heretofore, a structure has been known (for example, see Patent Reference 1) that, in a vehicular hood structure for protecting a collision member when the collision member collides against the hood, reinforces a central region portion (which hereinafter may be referred to as a hood general portion) excluding outer peripheral end portions of the hood. In order to plastically deform a hood inner panel with a reasonable load at a time of collision, a plural number of wave-like beads are formed at the hood inner panel and a reinforcement plate is disposed between a hood outer panel and the hood inner panel, or the like. A further structure is known (for example, see Patent Reference 2) that, in a vehicular hood structure, deforms a hood lock reinforce with a bending portion as a starting point when a load of a predetermined value or greater is inputted. The bending portion is provided at the hood lock reinforce that is provided between a hood inner panel and a hood outer panel, in order to reasonably suppress a load reaction that is inputted to a collision member when the collision member collides against a hood front end portion side, which is a hood front side of a hood general portion.

Now, with a structure in which these structures are included in combination to serve as a pedestrian protection measure, if a collision member collides against, for example, a vicinity of an intermediate position between the hood general portion and a portion close to a hood front end edge (a portion that includes a portion substantially directly above a hood lock portion), two loads are caused to act—a load that deforms the hood inner panel of the hood general portion and a load that deforms the hood lock reinforce of the hood front end portion—and there is a risk of a load reaction to be inputted to the collision member being increased.

Patent Reference 1: Japanese Patent Application Laid-Open (JP-A) No. 2004-58973
Patent Reference 2: JP-A No. 2004-50909

DISCLOSURE OF INVENTION

Problem to be Solved by the Invention

In consideration of the above circumstances, an object of the present invention is to provide a vehicular hood structure that is capable of generating more properly a load reaction to be inputted to a collision member, even if the collision member collides against the vicinity of an intermediate position between a hood general portion and a portion close to a hood front end edge so that a load acts to deform a hood inner panel of the hood general portion and a hood lock reinforce of a hood front end portion.

Means for Solving the Problem

A vehicular hood structure of the present invention that is recited in claim 1 includes: a hood outer panel that structures an outer plate of a hood that openably (and closeably) covers an engine compartment; a hood inner panel that is disposed at a hood lower side relative to the hood outer panel and structures an inner plate of the hood, and that is provided with a skeleton portion at which a plurality of reinforcement beads are formed in a central region excluding outer peripheral end portions; and a hood lock reinforce that is disposed between the hood outer panel and the hood inner panel to serve for reinforcement at a hood front end portion, and at which a weakened portion is provided, the weakened portion deforming at a time of input of a load of a predetermined value or greater from a hood upper side, wherein a flat portion extending in a hood width direction is provided at the hood inner panel adjacent to the hood front side of the skeleton portion, and a rear end portion of the hood lock reinforce is joined, at legs (leg portions) extending to the hood back side at portions spaced at a predetermined distance in the hood width direction, to the flat portion.

According to the vehicular hood structure of the present invention that is recited in claim 1, the skeleton portion, at which the plural number of reinforcement beads are formed at the central region excluding outer peripheral end portions, is provided at the hood inner panel. Thus, when, for example, a collision member collides against the vehicle upper side of the skeleton portion, both the hood outer panel and the skeleton portion of the hood inner panel plastically deform and absorb impact energy.

Further, the weakened portion that deforms at the time of input of a load of the predetermined value or greater from the hood upper side is provided at the hood lock reinforce, which is disposed between the hood outer panel and the hood inner panel for reinforcement at the hood front end portion. Thus, when, for example, a collision member collides against the hood front end portion and a load of the predetermined value or greater is inputted from the hood upper side, the weakened portion deforms and the hood lock reinforce absorbs impact energy.

Meanwhile, at the hood inner panel, the flat portion extending in the hood width direction is provided adjacent to the hood front side of the skeleton portion, and the legs, which extend to the hood rear side from portions at the rear end portion of the hood lock reinforce that are spaced at the predetermined distance in the hood width direction, are joined to the flat portion of the hood inner panel. Thus, compared to, for example, a comparative structure in which legs do not extend from a rear end portion of a hood lock reinforce but this rear end portion is joined to a skeleton portion of a hood inner panel, rigidity with respect to a load from the hood upper side is lower. Therefore, if, for example, a collision member collides from the hood upper side against the vicinity of the intermediate portion between the hood general portion and the portion close to the hood front end edge, the hood lock reinforce and the hood inner panel plastically deform with a lower load and absorb more impact energy than in the comparative structure. That is, an excessive rise in a deformation load of the hood lock reinforce and the hood inner panel is suppressed.

A vehicular hood structure of the present invention that is recited in claim 2 is the structure of claim 1 in which, at the hood inner panel, a crush bead is formed along the hood width direction at a substantially central portion of the skeleton portion in a hood length direction (hood front and back direction), and a reinforcement portion that is a protrusion to the hood lower side or the hood upper side is formed at a substantially central portion of the flat portion in the hood width direction.

According to the vehicle hood structure of the present invention that is described in claim 2, at the hood inner panel, the crush bead is formed along the hood width direction at the substantially central portion of the skeleton portion in the hood length direction, and the reinforcement portion that is a protrusion toward the hood lower side or the hood upper side is formed at the substantially central portion in the hood width direction of the flat portion. Thus, if, for example, a collision member collides from the hood upper side against the vicinity of the intermediate portion between the hood general portion and the portion close to the hood front end edge, local deformation at the flat portion of the hood inner panel is suppressed, and the whole of the hood front portion bendingly deforms with the crush bead as a starting point and generates a load. Therefore, rupturing of the hood lock reinforce and hood inner panel or the like as a result of local deformation ("bottoming out") may be prevented or restrained, and impact energy is effectively absorbed overall by bending deformation of the whole of the hood front portion.

A vehicular hood structure of the present invention that is recited in claim 3 is the structure of claim 2 in which the reinforcement portion is formed along the hood length direction.

According to the vehicle hood structure of the present invention that is described in claim 3, the reinforcement portion is formed along the hood length direction. Thus, if, for example, a collision member collides from the hood upper side against the vicinity of the intermediate portion between the hood general portion and the portion close to the hood front end edge, a load acting on the flat portion is efficiently propagated to the crush bead side, which is the hood back side, by the reinforcement portion. Therefore, the hood bendingly deforms more stably, with the crush bead as a starting point.

A vehicular hood structure of the present invention that is recited in claim 4 is the structure of any one of claim 1 to claim 3 in which the legs are formed at a hood width direction central portion and two hood width direction end portion sides of the hood lock reinforce.

According to the vehicle hood structure of the present invention that is described in claim 4, the leg is formed at each of two hood width direction end portions and a hood width direction central portion of the hood lock reinforce. Thus, compared with a comparative structure in which, for example, legs at each of two hood width direction sides are formed close to a hood width direction central region, a pitch between joining points of the hood lock reinforce to the hood inner panel is wider and the hood lock reinforce deforms more easily in response to a load from the hood upper side. Therefore, if, for example, a collision member collides from the hood upper side against the vicinity of the intermediate portion between the hood general portion and the portion close to the hood front end edge, the hood lock reinforce is plastically deformed by a lower load and absorbs more impact energy than in the comparative structure, and an excessive rise in a deformation load of the hood lock reinforce is suppressed.

A vehicular hood structure of the present invention that is recited in claim 5 is the structure of any one of claim 1 to claim 4 in which the reinforcement beads are spaced at a predetermined distance in the hood width direction and are formed substantially along the hood length direction, and front ends of the reinforcement beads are disposed to be separated in the hood length direction from rear ends of the legs.

According to the vehicle hood structure of the present invention that is described in claim 5, the front ends of the reinforcement beads formed substantially along the hood length direction are disposed to be separated in the hood length direction from the rear ends of the legs. Thus, compared with a comparative structure in which, for example, a hood length direction position of front ends of reinforcement beads is aligned with a hood length direction position of a rear end of a leg, the hood inner panel deforms more easily in response to a load from the hood upper side, via the leg. Therefore, if, for example, a collision member collides from the hood upper side against the vicinity of the intermediate portion between the hood general portion and the portion close to the hood front end edge, the hood inner panel is plastically deformed by a lower load and absorbs more impact energy than in the comparative structure, and an excessive rise in a deformation load of the hood inner panel is suppressed.

EFFECTS OF THE INVENTION

As described above, according to the vehicular hood structure recited in claim 1 relating to the present invention, there is an excellent effect in that, even if a collision member collides against the vicinity of the intermediate position between the hood general portion and the portion close to the hood front end edge so that a load acts to deform the hood inner panel of the hood general portion and the hood lock reinforce of the hood front end portion, a load reaction to be inputted to the collision member may be generated more properly.

According to the vehicular hood structure recited in claim 2, there is an excellent effect in that, even if a collision member collides against the vicinity of the intermediate position between the hood general portion and the portion close to the hood front end edge so that a load acts to deform the hood inner panel of the hood general portion and the hood lock reinforce of the hood front end portion, impact energy may be efficiently absorbed overall by bending deformation of the whole of the hood front portion.

According to the vehicular hood structure recited in claim 3, there is an excellent effect in that, even if a collision member collides against the vicinity of the intermediate position between the hood general portion and the portion close to the hood front end edge, a load acting on the flat portion may be efficiently propagated to the crush bead side, which is the hood back side, by the reinforcement portion.

According to the vehicular hood structure recited in claim 4, there is an excellent effect in that, even if a collision member collides against the vicinity of the intermediate position between the hood general portion and the portion close to the hood front end edge so that a load acts to deform the hood inner panel of the hood general portion and the hood lock reinforce of the hood front end portion, an excessive rise in a deformation load of the hood lock reinforce may be suppressed.

According to the vehicular hood structure recited in claim 5, there is an excellent effect in that, even if a collision member collides against the vicinity of the intermediate position between the hood general portion and the portion close to the hood front end edge so that a load acts to deform the hood inner panel of the hood general portion and the hood lock reinforce of the hood front end portion, an excessive rise in a deformation load of the hood inner panel may be suppressed.

BEST MODE FOR CARRYING OUT THE INVENTION

Structure of Exemplary Embodiment

A vehicular hood structure relating to an exemplary embodiment of the present invention is described using FIG. 1 to FIG. 8. An arrow FR, which is shown as appropriate in these drawings, represents a vehicle front side, an arrow UP represents a vehicle upper side, and an arrow W represents a vehicle width direction. In a state in which the hood is closed, a hood length direction is the same direction as the vehicle length direction, a hood vertical direction is the same direction as the vehicle vertical direction, and a hood width direction is the same direction as the vehicle width direction.

Figure 1:
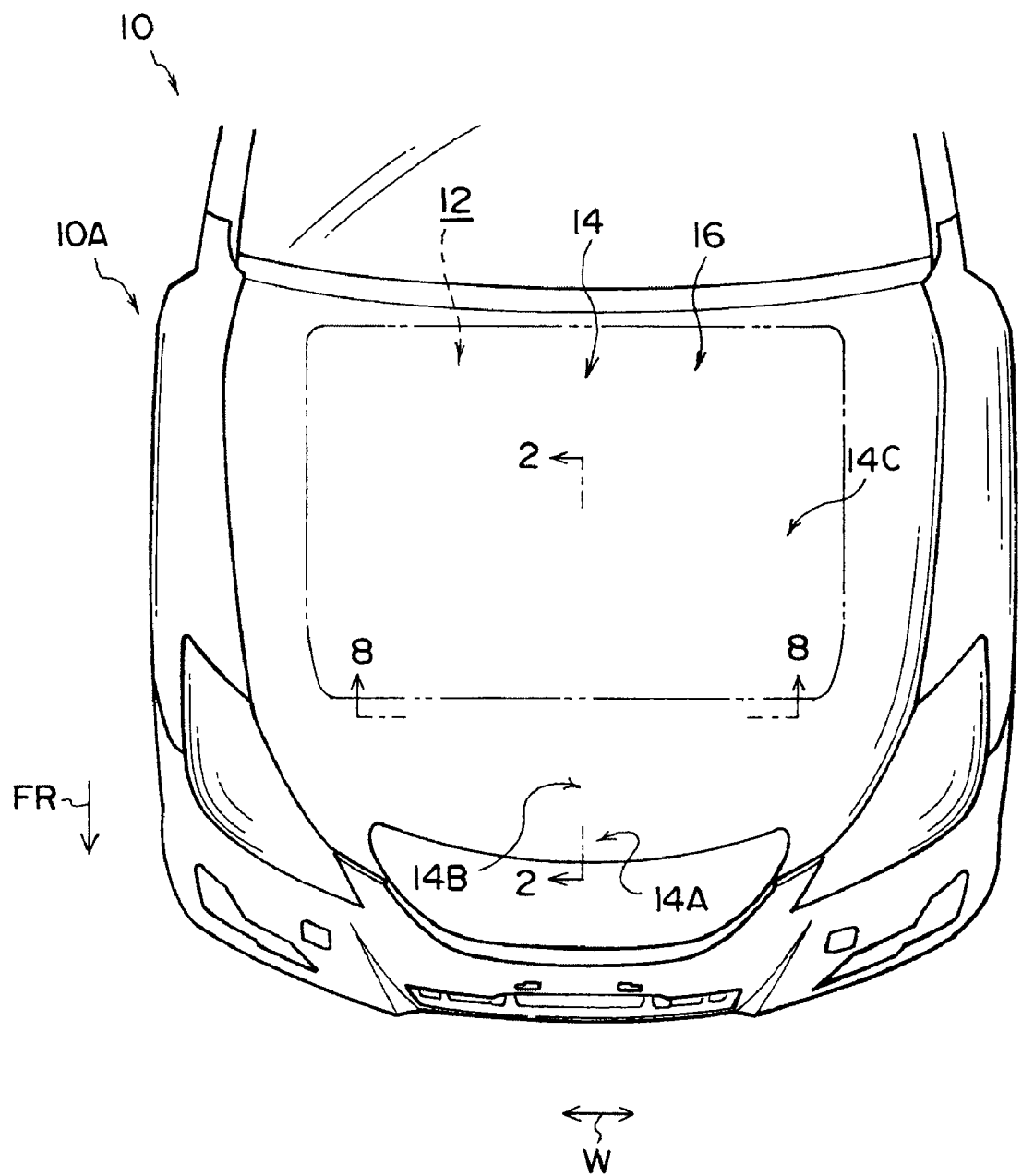
FIG. 1 is a plan view illustrating a vehicle front portion at which a vehicle hood structure relating to an exemplary embodiment of the present invention is applied.

As illustrated in FIG. 1, at a vehicle front portion 10A of an automobile (vehicle) 10, a hood (engine hood) 14 that openably and closeably covers an engine compartment 12 is provided. In the present exemplary embodiment, the hood 14 is fabricated of an aluminium alloy. A hinge (not illustrated) is provided at a rear end portion in the vehicle length direction of the hood 14. Thus, the hood 14 is movable to turn about an axis in the vehicle width direction at the hinge (not illustrated), and thus is openable and closeable.

Figure 2:
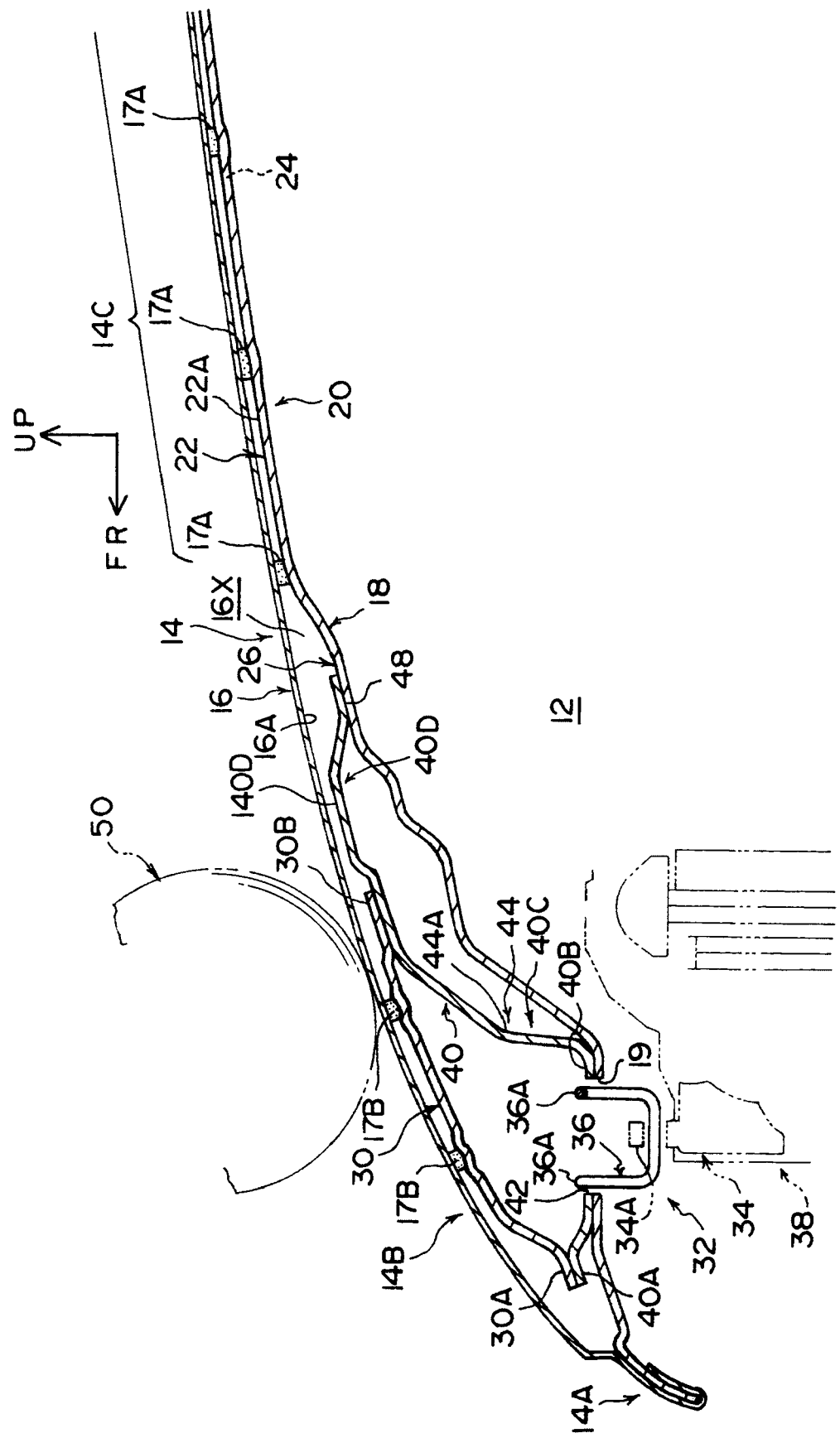
FIG. 2 is a magnified sectional view taken along line 2-2 of FIG. 1.

As illustrated in FIG. 2, which is a magnified sectional view taken along line 2-2 of FIG. 1, the hood 14 is structured to include a hood outer panel 16, which substantially constitutes an outer plate of the hood 14 and extends along the vehicle length direction, and a hood inner panel 18, which is disposed at the hood lower side relative to the hood outer panel 16 and constitutes an inner plate of the hood 14. The hood outer panel 16 and the hood inner panel 18 are both structured by press-forming of aluminium alloy plates. Outer peripheral portions of the hood outer panel 16 are joined to the hood inner panel 18 by a hemming process. Here, a front end edge of the hood outer panel 16 is joined to a front end edge of the hood inner panel 18 and constitutes a hood front end edge 14A. Further, in the state in which the hood outer panel 16 and hood inner panel 18 are assembled, the two form a closed cross-section structure (in the present exemplary embodiment, forming a "wafer sandwich structure"), and a cavity 16X in the hood vertical direction is formed between the two.

Figure 3:
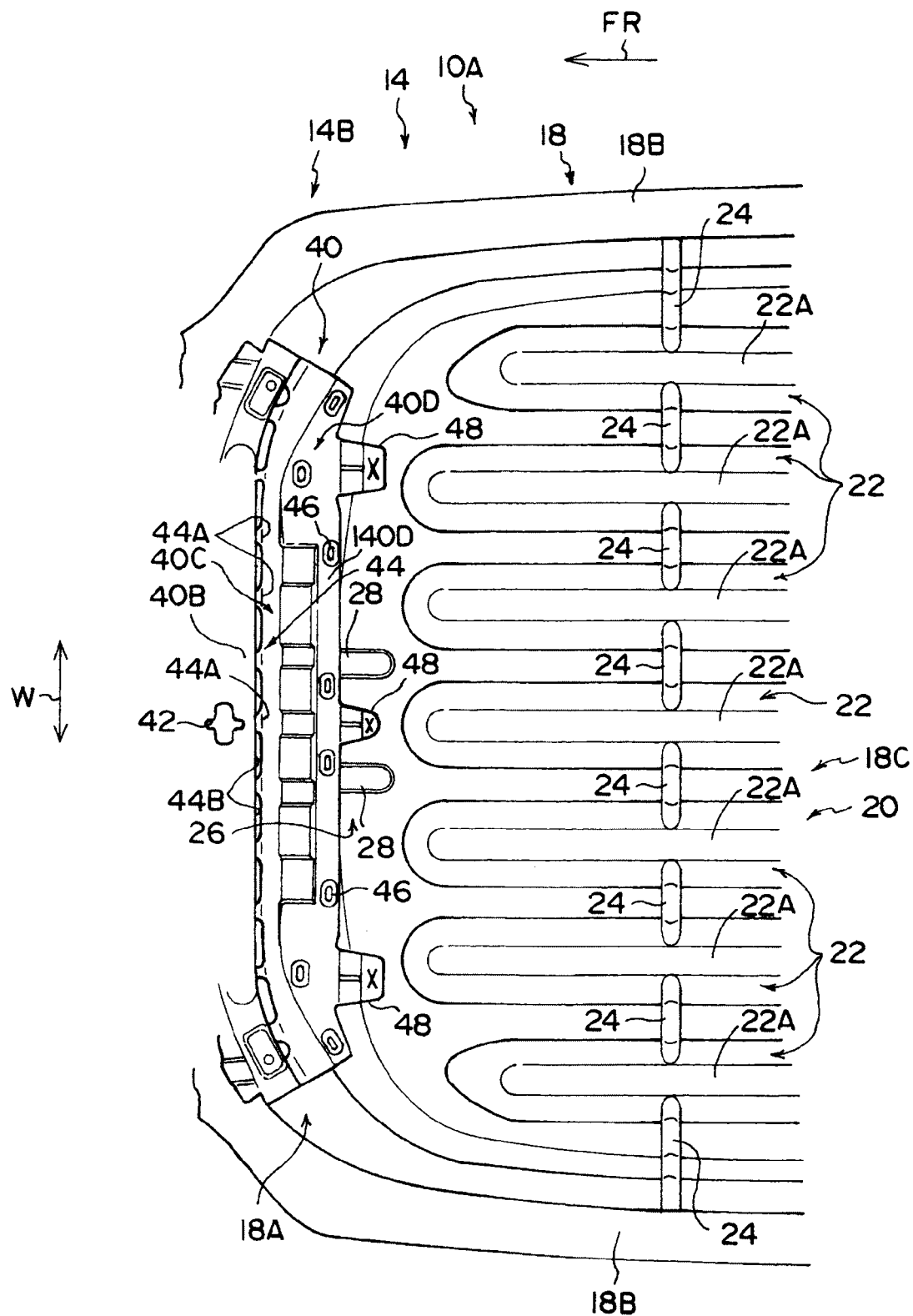
FIG. 3 is a plan view illustrating principal portions of a hood inner panel and a hood lock reinforce of the exemplary embodiment of the present invention.
Figure 4:
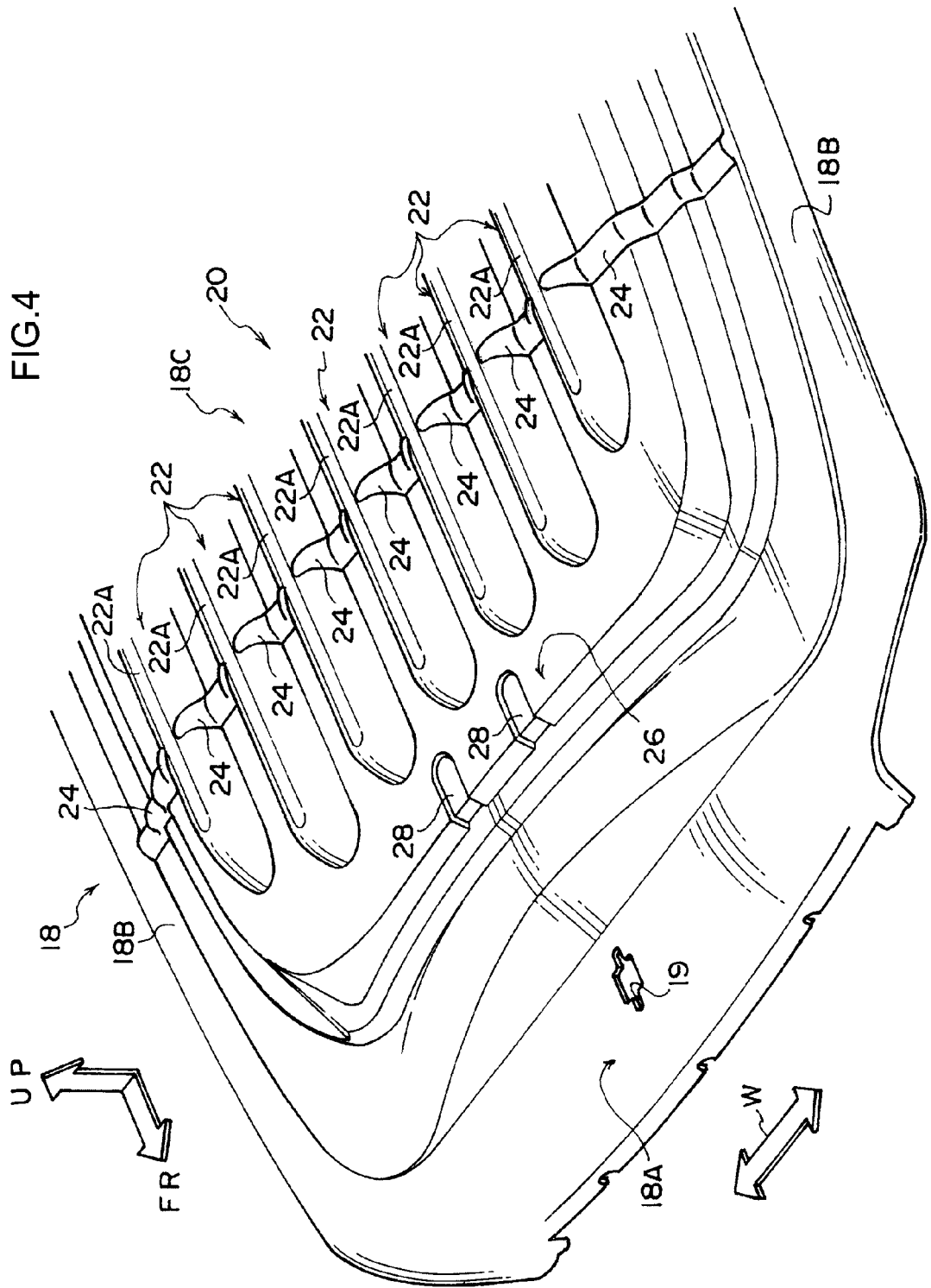
FIG. 4 is a perspective view illustrating principal portions of the hood inner panel of the exemplary embodiment of the present invention.

FIG. 3 illustrates relationships between mounting positions of the hood inner panel 18 and a hood lock reinforce 40 (described in detail hereafter) at the vehicle front portion 10A in a plan view. FIG. 4 illustrates principal portions of the hood inner panel 18 in a perspective view. As shown in FIG. 3 and FIG. 4, at the hood inner panel 18, reinforcement beads 22 are formed at a skeleton portion 20 that constitutes a central region 18C excluding outer peripheral end portions of the hood inner panel 18 (of the outer peripheral end portions, a front end portion is indicated with the reference numeral 18A, hood width direction outer side end portions are indicated with the reference numeral 18B, and a rear end portion is omitted from the drawings). Note that in FIG. 3 and FIG. 4 the rear end side of the hood inner panel 18 is omitted from the drawings. The reinforcement beads 22 bulge to the hood upper side, and a plural number thereof are formed substantially along the hood length direction, spaced at a predetermined distance in the hood width direction.

As illustrated in FIG. 2, a portion of a peak portion 22A of each reinforcement bead 22 is joined by mastic 17A, which is an adhesive, to a rear face 16A of the hood outer panel 16. In the present exemplary embodiment, a region that is constituted by the skeleton portion 20 of the hood inner panel 18 and a portion of the hood outer panel 16 that opposes the skeleton portion 20 is referred to as a hood general portion 14C. As shown in FIG. 1, this hood general portion 14C serves as a central region portion excluding outer periphery end portions of the hood 14 (see the region enclosed by two-dot chain lines in FIG. 1).

Further, as illustrated in FIG. 3 and FIG. 4, at the hood inner panel 18, crush beads 24 are formed along the hood width direction as protrusions toward the hood upper side, at a substantially central portion of the skeleton portion 20 in the vehicle length direction. The crush beads 24 are provided with functionality as starting points for the hood inner panel 18 to be inflected to the hood upper side at the substantially central portion thereof in the vehicle length direction at the time of a vehicle frontal collision (with inverted letter V shapes in side view). In the present exemplary embodiment, the crush beads 24 are formed to link between the peak portions 22A of the reinforcement beads 22, but structures are possible in which the crush beads are continuous along the hood width direction, that is, are formed continuously along the hood width direction even over the peak portions 22A of the reinforcement beads 22.

As illustrated in FIG. 4, at the hood inner panel 18, a flat portion 26 that extends in the vehicle width direction is provided adjacent to the hood front side of the skeleton portion 20. The flat portion 26 is formed in a flat shape and is a region at which the reinforcement beads 22 are not formed. A total of two small beads 28 that serve as reinforcement portions are formed symmetrically between left and right at a substantially central portion of the flat portion 26 in the hood width direction. The small beads 28 are protrusions toward the hood lower side and are formed along the hood length direction (that is, in a direction orthogonal to the direction of extension of the crush beads 24 in a hood plan view). Regarding a bead height of the small beads 28 (protrusion amounts to the hood lower side), a suitable setting will vary in accordance with stiffness of the hood inner panel 18 and stiffness of the hood lock reinforce 40 (see FIG. 3, described in more detail hereafter) but is set (to 3 mm in the present exemplary embodiment) with the criterion that it is not more than 30% of a bead height (protrusion amount to the vehicle upper side) of the reinforcement beads 22.

Because a hood front end portion 14B side of the hood 14 illustrated in FIG. 2 is comparatively heavy, it is necessary to prevent the hood front end portion 14B side falling due to gravity when the hood 14 is in a closed state. Ridge lines along the vehicle length direction are formed by the small beads 28 (see FIG. 4). Thus, with the hood structure relating to the present exemplary embodiment, the hood front end portion 14B side is effectively prevented from falling due to gravity.

As illustrated in FIG. 2, a dent reinforce 30 (in a broad sense, an element to be understood as a reinforcement member for hood outer panel reinforcement) is disposed between the hood outer panel 16 and the hood inner panel 18 for suppressing deformation of the hood outer panel 16 when the hood 14 closes, and extends in the hood width direction (a direction orthogonal to the surface of the paper of FIG. 2). The dent reinforce 30 has a plate form, extends substantially along the hood outer panel 16, and is joined to the rear face 16A of the hood outer panel 16 by mastic 17B, that serves as an adhesive.

A hood lock portion 32 is disposed in correspondence with a hood width direction central portion of the hood front end portion 14B (more, specifically, the portion close to a hood front end edge 14A) of the hood 14 in the closed state. The hood lock portion 32 is structured to include a hood lock device 34 and a striker 36. The hood lock device 34 is disposed at a radiator support upper 38 (in broad terms, an element to be understood as a vehicle skeleton member) inside the engine compartment 12, and the striker 36 is disposed at the hood 14 (the hood inner panel 18). A latch 34A (locking member) that constitutes a portion of the hood lock device 34 is engageable with the striker 36.

As illustrated in FIG. 4, a penetrating hole 19 is formed penetrating through the front end portion 18A of the hood inner panel 18. As illustrated in FIG. 2, the striker 36 is inserted from the hood upper side into this penetrating hole 19. The striker 36 is formed in an inflected shape (a substantial letter U shape) that opens to the hood upper side in a vehicle side view, is supported in a fixed state at a lower wall portion 40B of the hood lock reinforce 40 via an unillustrated fixing member (in broad terms, the hood lock reinforce 40 is an element to be understood as a reinforcement member for hood front end portion reinforcement), and protrudes to the hood lower side relative to the hood inner panel 18.

As illustrated in FIG. 2 and FIG. 3, the hood lock reinforce 40 has a plate form, is disposed between the hood outer panel 16 and the hood inner panel 18 for reinforcement of the hood front end portion 14B (see FIG. 2), extends along the hood width direction, and reinforces peripheral regions of a striker attachment portion of the hood 14. As illustrated in FIG. 2, a front end flange portion 40A of the hood lock reinforce 40 is joined to a front end flange portion 30A of the dent reinforce 30. Of the hood lock reinforce 40, a hood back side of the front end flange portion 40A is formed in a step shape that steps down toward the hood lower side. In the lower wall portion 40B, which is disposed a step down relative to the front end flange portion 40A, a penetrating hole 42 for insertion of the striker 36 is formed (see FIG. 3), and attachment end portions 36A of the striker 36 are fixed to the front end flange portion 40A. Herein, the attachment end portions 36A, which are provided at the front side upper portion and rear side upper portion of the striker 36, are inflected in the hood width direction, toward mutually opposite directions.

A standing wall portion 40C is formed rising diagonally upward toward the back of the hood from a back end of the lower wall portion 40B, and an upper portion of a hood width direction intermediate portion of the standing wall portion 40C is joined to a rear end flange portion 30B of the dent reinforce 30. A weakened portion 44 is provided extending from a hood vertical direction central portion to a lower portion of the standing wall portion 40C. That is, an inflecting portion 44A is formed at the hood vertical direction central portion of the standing wall portion 40C, and long holes 44B (see FIG. 3) are formed in the hood vertical direction lower portion of the standing wall portion 40C. Thus, the portion extending from the vertical direction central portion to the lower portion of the standing wall portion 40C serves as the weakened portion 44, which is weakened.

The inflecting portion 44A is a portion of the hood vertical direction central portion of the standing wall portion 40C that is inflected so as to tilt to the hood back side, and forms a fold line portion substantially along the hood width direction. This fold line portion is a deformation starting point portion that initiates buckling at a time of collision. A portion at the hood back side relative to the inflecting portion 44A is more gently inclined than a portion at the hood front side relative to the inflecting portion 44A. As illustrated in FIG. 3, the long holes 44B are formed to be spaced at a predetermined distance in the hood width direction at the hood front side (that is, the hood lower side) relative to the inflecting portion 44A. Thus, the standing wall portion 40C serves as a stiffness difference structure that is provided with a difference in stiffnesses bounded by the fold line portion of the inflecting portion 44A. Thus, the weakened portion 44 is specified so as to deform with the fold line portion of the inflecting portion 44A as a starting point when a load of a predetermined value or greater is inputted from the vehicle hood upper side relative to the hood lock reinforce 40 illustrated in FIG. 2.

At the hood lock reinforce 40, a portion of a rear end portion 40D, which is the hood back side of the standing wall portion 40C, serves as a peak wall portion 140D and is disposed close to the hood outer panel 16. As illustrated in FIG. 3, mastic charging portions 46, which are spaced at intervals in the vehicle width direction, are formed in the peak wall portion 140D. The hood lock reinforce 40 is joined to the hood outer panel 16 illustrated in FIG. 2 via mastic for adhesion (not shown) that is charged into the mastic charging portions 46.

Further, as illustrated in FIG. 3, legs 48 for joining are formed at the rear end portion 40D of the hood lock reinforce 40. The legs 48 extend to the hood back side from portions which are spaced at a predetermined distance in the hood width direction. A total of three of the legs 48 are formed, at a hood width direction central portion and each of two hood width direction end portion sides of the hood lock reinforce 40, and distal end portions of the legs 48 (rear end portions at the hood back side) are joined to the flat portion 26 of the hood inner panel 18 by spot welds (the joining points are indicated with cross marks). That is, joining point surfaces of the hood lock reinforce 40 with the hood inner panel 18 are standalone surfaces—the legs 48—and the joining portions are weakened. As illustrated in FIG. 2, the legs 48 are provided at the vehicle back side in the vehicle length direction relative to the position of provision of the hood lock portion 32. Further, as illustrated in FIG. 3, in the state in which the legs 48 are joined to the flat portion 26, the front ends of the reinforcement beads 22 of the hood inner panel 18 are disposed to be separated from the rear ends of the legs 48 by a predetermined distance to the hood back side (a setting of at least 20 mm is preferable, and it is 20 mm in the present exemplary embodiment).

Operations and Effects of the Exemplary Embodiment

Next, operations and effects of the above-described exemplary embodiment are described.

As illustrated in FIG. 3, at the hood inner panel 18, the skeleton portion 20 at which the plural reinforcement beads 22 are formed is provided at the central region 18C excluding the outer peripheral end portions. Thus, if, for example, a collision member collides against the hood general portion 14C shown in FIG. 1 (the region enclosed by two-dot chain lines in FIG. 1, which is the hood upper side of the skeleton portion 20 (see FIG. 3)), the hood outer panel 16 and the skeleton portion 20 of the hood inner panel 18 shown in FIG. 3 plastically deform and absorb impact energy.

Further, as illustrated in FIG. 2, the weakened portion 44 that deforms when a load of a predetermined value or greater is inputted from the hood upper side is provided at the hood lock reinforce 40 that is disposed between the hood outer panel 16 and the hood inner panel 18 for reinforcement at the hood front end portion 14B. Thus, if, for example, a collision member collides against the hood front end portion 14B and a load of the predetermined value or greater is inputted from the hood upper side, the hood lock reinforce 40 buckles, by the weakened portion 44 deforming with the fold line of the inflecting portion 44A as a starting point, and absorbs the impact energy.

Meanwhile, as illustrated in FIG. 3, the flat portion 26 extending in the hood width direction is provided at the hood inner panel 18 adjacent to the hood front side of the skeleton portion 20, and the legs 48 extending to the hood back side and spaced at the predetermined distance in the hood width direction are joined to the flat portion 26 of the hood inner panel 18. Thus, the rear end portion 40D of the hood lock reinforce 40 has lower stiffness with respect to a load from the hood upper side than in a comparative structure in which a rear end portion (40D) is joined to a skeleton portion (20) of a hood inner panel (18) rather than legs (48) being extended at the rear end portion (40D) of a hood lock reinforce (40).

Therefore, if a collision member 50 collides from the hood upper side against the vicinity of the intermediate portion between the hood general portion 14C and the portion close to the hood front end edge 14A (a portion substantially directly above the hood lock portion 32), which is illustrated in FIG. 2, the hood lock reinforce 40 and the hood inner panel 18 plastically deform with a lower load and absorb more impact energy than in the comparative structure. That is, an excessive rise in a deformation load of the hood lock reinforce 40 and the hood inner panel 18 is suppressed. Herein, similar effects are obtained even if the collision position of the collision member 50 is somewhat to the hood back side relative to the position shown in FIG. 2 (for example, a vicinity directly above a boundary portion at which the hood lock reinforce 40 is joined to the hood inner panel 18).

Now, in the vehicular hood structure of the present exemplary embodiment, as illustrated in FIG. 3, the legs 48 are formed at the hood width direction central portion and the two hood width direction end portion sides of the hood lock reinforce 40. Thus, the pitch of joining points to the hood inner panel 18 of the hood lock reinforce 40 is wider and the hood lock reinforce 40 flexingly deforms more easily in response to a load from the hood upper side than in a comparative structure in which, for example, legs (48) at two sides of the hood width direction are formed close to a hood width direction central region. Furthermore, the front ends of the reinforcement beads 22 are disposed to be separated to the hood back side from the rear ends of the legs 48. Thus, the hood inner panel 18 deforms (crushes) more easily in response to a load from the hood upper side via the legs 48 than in a comparative structure in which a hood length direction position of front ends of the reinforcement beads 22 is aligned with a hood length direction position of rear ends of the legs 48. Therefore, an excessive rise in a deformation load (crushing load) of the hood lock reinforce 40 and the hood inner panel 18 is effectively prevented.

Figure 5:
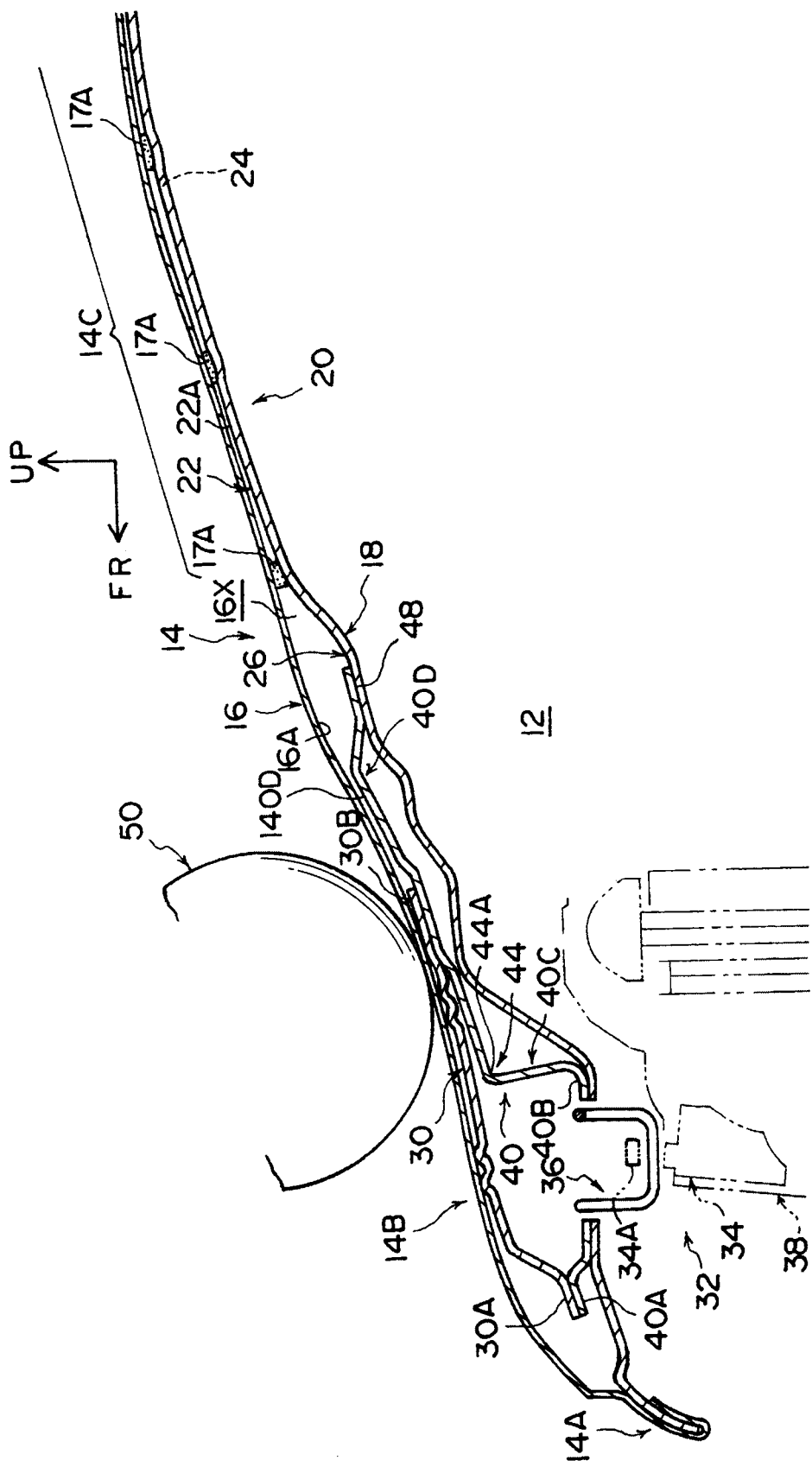
FIG. 5 is a magnified sectional view of the vehicular hood structure relating to the exemplary embodiment of the present invention, illustrating a state in which a collision member has collided thereagainst.

Further, in the vehicular hood structure of the present exemplary embodiment, the crush beads 24 that are protrusions toward the hood upper side are formed at the hood inner panel 18 along the hood width direction, substantially at the hood length direction central portion of the skeleton portion 20, and the small beads 28 that are protrusions toward the hood lower side are formed at the substantially central portion in the hood width direction of the flat portion 26. Thus, if the collision member 50 collides from the hood upper side against the vicinity of the intermediate portion between the hood general portion 14C and the portion close to the hood front end edge 14A (the portion substantially directly above the hood lock portion 32) which is illustrated in FIG. 2, then as illustrated in FIG. 5, local deformation at the flat portion 26 of the hood inner panel 18 is suppressed, and the whole of the front portion of the hood 14 bendingly deforms (is crushed) with the crush beads 24 (see FIG. 3) as a starting point, and generates a load. Therefore, rupturing of the hood lock reinforce 40 and the hood inner panel 18 or the like as a result of local deformation ("bottoming out") may be prevented or restrained, and impact energy is effectively absorbed (EA) overall (dispersal of the impact load) by bending deformation of the whole of the front portion of the hood 14 (by utilizing bending stiffness of the whole of the hood 14 to generate a load).

In particular, as illustrated in FIG. 3, in the vehicular hood structure of the present exemplary embodiment, the small beads 28 are formed along the hood length direction. Thus, if, for example, the collision member 50 collides from the hood upper side against the vicinity of the intermediate portion between the hood general portion 14C and the portion close to the hood front end edge 14A (the portion substantially directly above the hood lock portion 32), which are illustrated in FIG. 2, a load acting on the flat portion 26 is effectively propagated to the crush bead 24 side (see FIG. 3), which is the hood back side, by the small beads 28 (see FIG. 3), and stress is concentrated at the crush beads 24. Therefore, the hood 14 bendingly deforms more stably, with the crush beads 24 as a starting point.

Thus, a protective measure for the collision member 50 may be implemented in which, when the whole of the front portion of the hood 14 illustrated in FIG. 5 is bendingly deformed, loads that are generated when the respective components of the hood lock reinforce 40, the hood inner panel 18 and the like are crushed are moderated, without energy absorption of the respective components being impeded.

As a supplementary note, in general, with low stiffness of a hood general portion, an energy absorption amount is smaller when a free running distance is greater. Therefore, particularly when a hood is fabricated of an aluminium alloy, it is often the case that a hood inner panel is joined to a hood outer panel and a "wafer sandwich structure" is formed to provide for reinforcement. Moreover, in general, a hood lock reinforce has a large thickness and high stiffness, in consideration of denting characteristics and the like. Thus, as in the above-described exemplary embodiment, it is often the case that a weakened structure is employed so as to deform and absorb energy when an impact load of a predetermined value or greater acts from the hood upper side. Thus, with a structure in which the hood general portion is reinforced and the hood lock reinforce is weakened (that is, a structure that employs contrasting measures—weakening at the hood front end side and reinforcement at the general portion side), if, for example, a collision member collides against the vicinity of an intermediate portion between the hood general portion and a portion close to the hood front end edge (a portion including a portion substantially directly above the hood lock portion), two loads may be caused to act—a load that deforms the hood inner panel of the hood general portion and a load that deforms the hood lock reinforce of the front end portion. With this structure or suchlike, there is thought to be a risk that a load reaction to be inputted to the collision member is increased. In contrast, with the vehicular hood structure of the present exemplary embodiment, even in the described case, a load reaction to be inputted to the collision member may be generated more properly.

Figure 6:
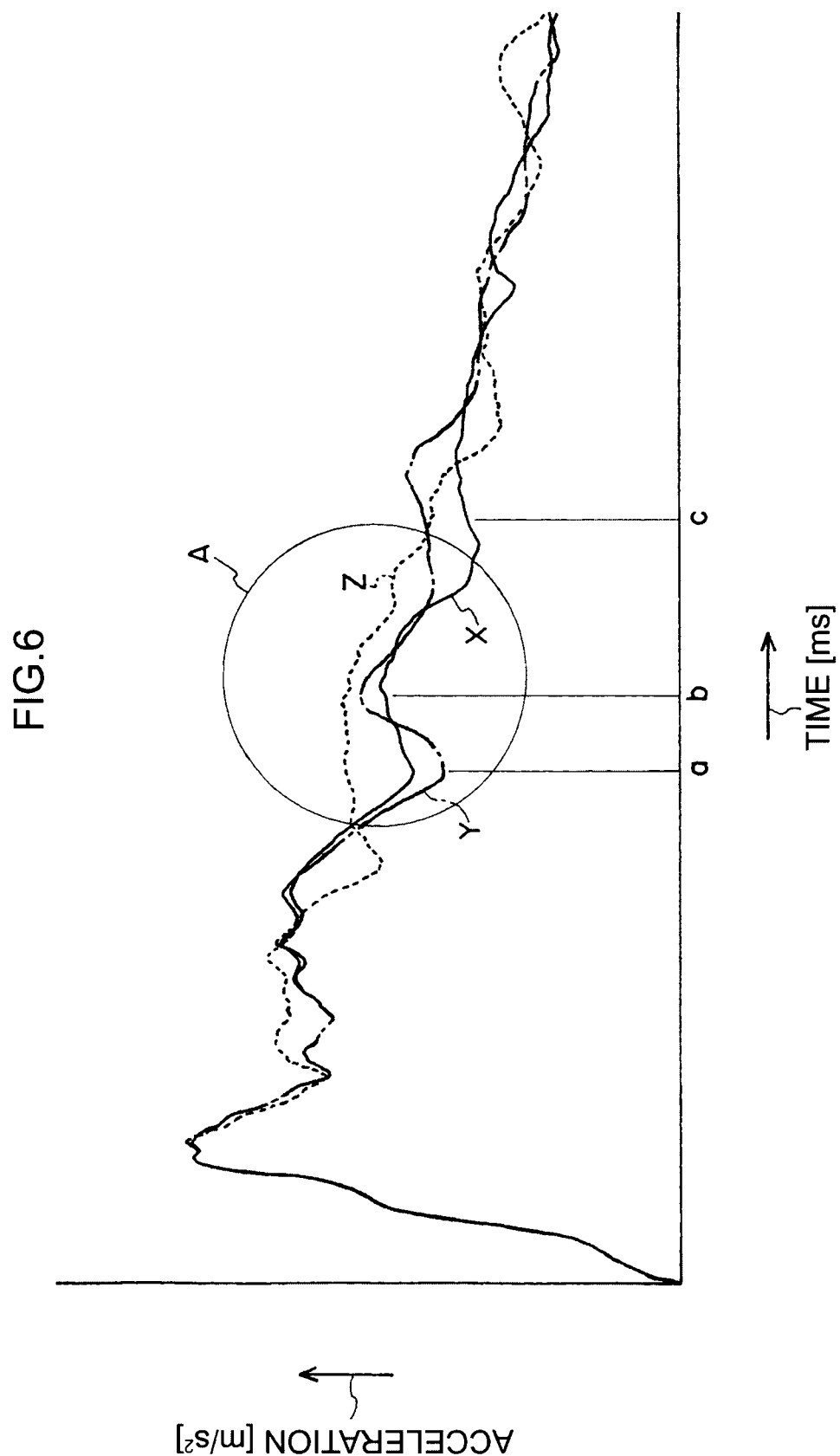
FIG. 6 is a graph illustrating relationships between acceleration and time when collision members collide with vehicle hoods.
Figure 7:
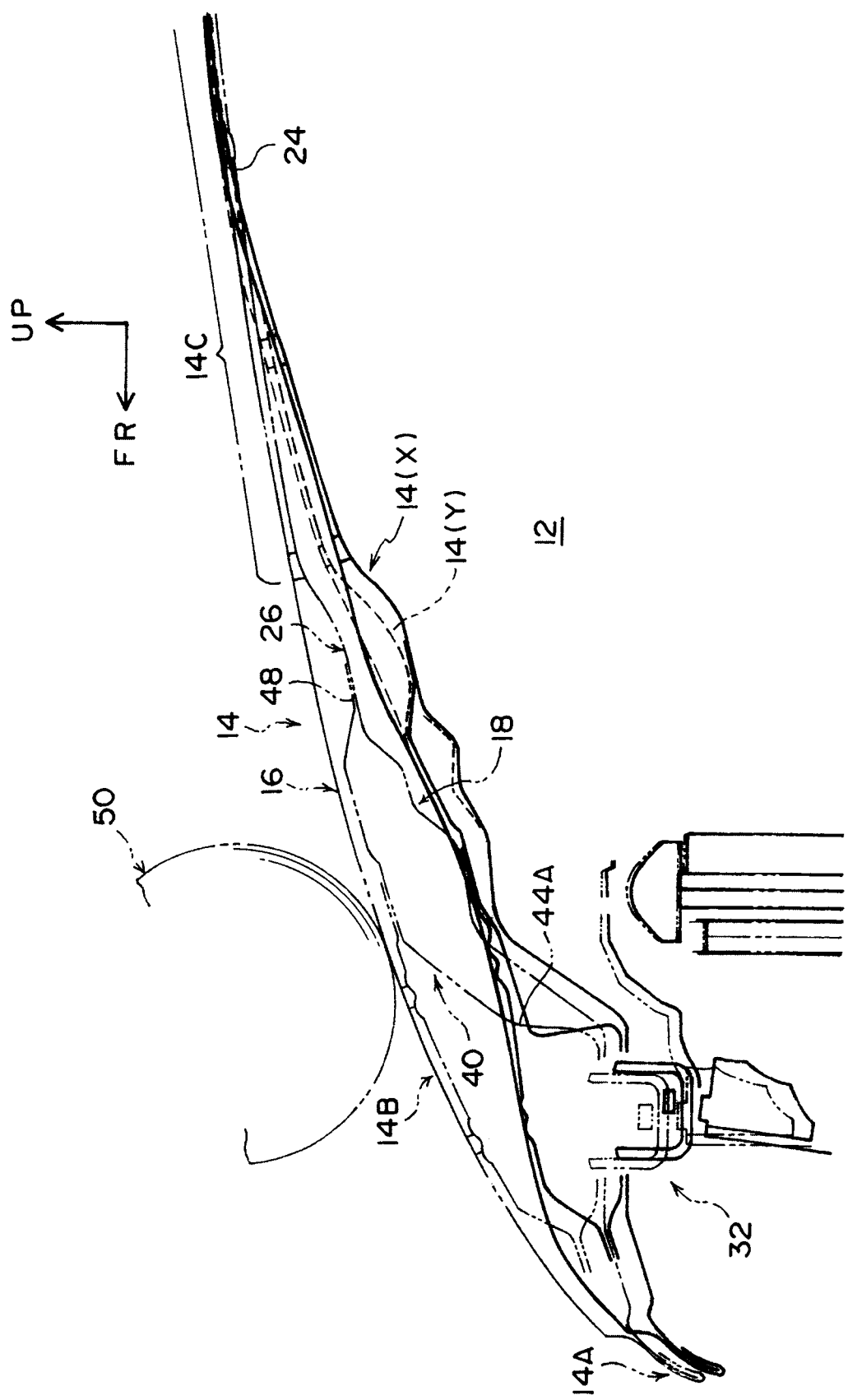
FIG. 7 is a side sectional view illustrating a shape before testing and deformation modes in a section cut in the same manner as in FIG. 2.
Figure 8:
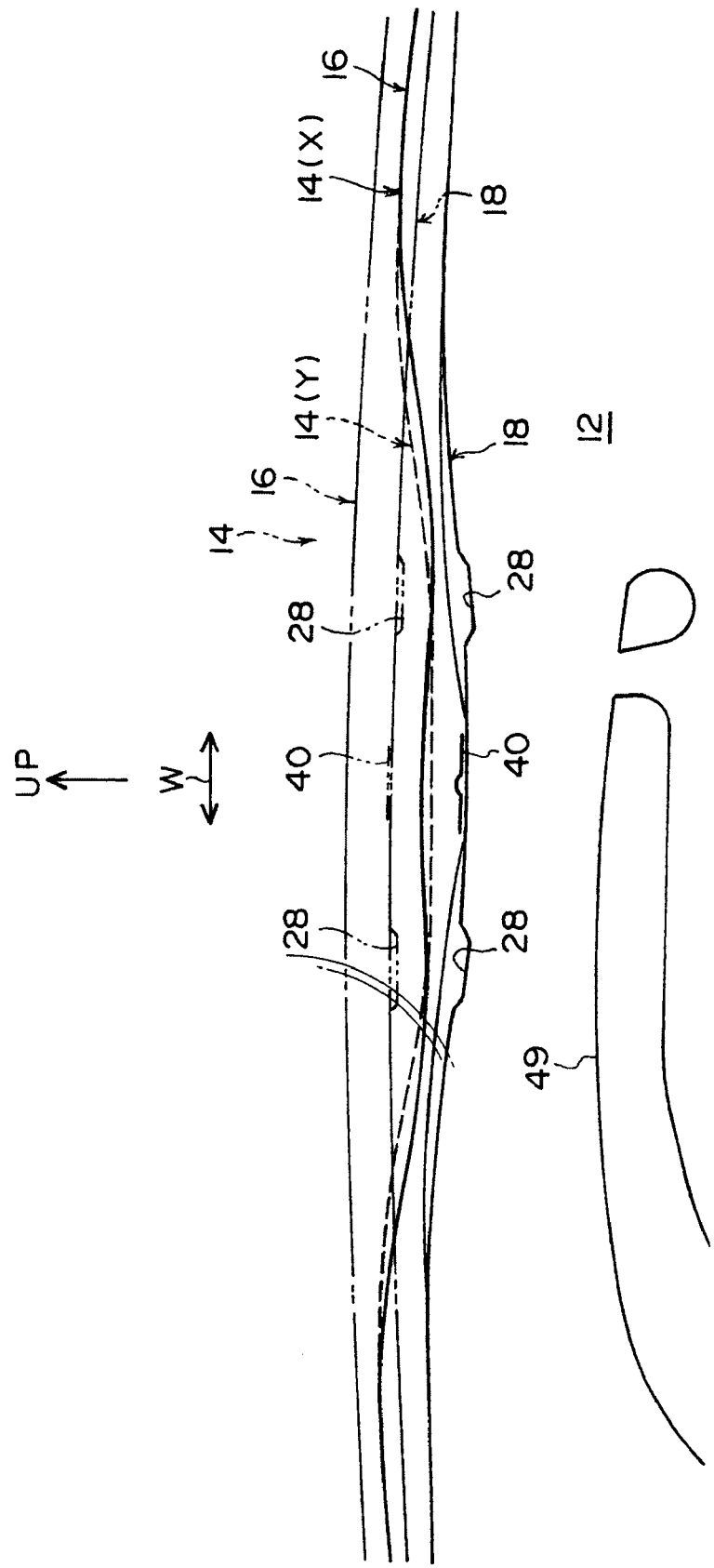
FIG. 8 is a magnified sectional view of a front elevation illustrating a shape before testing and deformation modes in a section cut along line 8-8 of FIG. 1.

Next, the above operations and effects will be additionally described while referring to FIG. 6 to FIG. 8, which illustrate results of a pedestrian protection test in which a collision member (50) is caused to collide against the vicinity of an intermediate portion between a hood general portion (14C) and a portion close to a hood front end edge (14A) (a portion substantially directly above a hood lock portion (32)).

FIG. 6 is a graph illustrating relationships between acceleration and time. The horizontal axis of the graph represents time and the vertical axis represents acceleration (which is deceleration produced in the collision member (this is a negative acceleration but is shown by absolute values in FIG. 6), that is, acceleration that the collision member experiences). The solid line represents test results with a structure X similar to the exemplary embodiment described above, the single-dot chain line represents test results with a structure Y in which the crush beads (24) and small beads (28) of the structure of the above exemplary embodiment are not specified (a structure that is otherwise the same as the above exemplary embodiment), and the dotted line represents test results with a comparative structure Z in which the crush beads (24) and small beads (28) of the structure of the above exemplary embodiment are not specified and legs (48) are not provided extending from a rear end portion (40D) of a hood lock reinforce (40) but the rear portion (40D) is joined to a skeleton portion (20) of a hood inner panel (18).

In FIG. 7 (a side sectional view shown in a section cut in the same manner as in FIG. 2) and FIG. 8 (a sectional view in a front elevation taken along line 8-8 of FIG. 1), the two-dot chain line shows a state before the test, the solid line shows a deformation mode (final state) after the collision when the structure X the same as in the above exemplary embodiment is provided (the case of the solid line in FIG. 6), and the dotted line shows the deformation mode (final state) after the collision in the case of the structure Y in which the crush beads (24) and small beads (28) of the structure of the above exemplary embodiment are not specified (the case of the single-dot chain line in FIG. 6). Reference numeral 49 in FIG. 8 indicates an inlet.

As illustrated in FIG. 6, it is seen that the structure Y represented by the single-dot chain line and the structure X represented by the solid line, overall (in particular, see the region enclosed by the thin line in the graph of FIG. 6), are lower in acceleration and lower in load (load=mass×acceleration) than the comparative structure Z represented by the dotted line.

Furthermore, if the single-dot chain line and the solid line are compared, the single-dot chain line shows a smaller acceleration than the solid line several milliseconds after the start of a collision (point a in FIG. 6), but thereafter (for example, point b and point c in FIG. 6), the solid line generally shows smaller acceleration than the single-dot chain line. Overall, an energy absorption amount is larger in the case of the solid line of structure X. The acceleration is smaller with the single-dot chain line structure Y than with the solid line structure X several milliseconds after the start of the collision (point a in FIG. 6) because of vicinities of the flat portion 26 to which the legs 48 are joined (more specifically, ridge line portions of leg base portions of the hood lock reinforce) deforming, and the acceleration is thereafter generally smaller for the solid line structure X than for the single dot-chain line structure Y because the stress is concentrated by the crush beads (24) and the whole of the hood (14) bendingly deforms.

According to FIG. 7 and FIG. 8, when the deformation mode of the dotted line structure Y is compared with the deformation mode of the solid line structure X, because the crush beads (24) are the starting point of bending in the solid line structure X, it is seen that the whole of the hood (14) bendingly deforms more than in the dotted line structure Y. Thus, energy absorption may be made more efficient with the solid line structure X.

As described hereabove, according to the vehicle hood structure relating to the present exemplary embodiment, even if the collision member 50 collides against the vicinity of the intermediate portion between the hood general portion 14C and the portion close to the hood front end edge 14A (the portion substantially directly above the hood lock portion 32) and a load acts that deforms the hood inner panel 18 of the hood general portion 14C and the hood lock reinforce 40 of the hood front end portion 14B, a load reaction to be inputted to the collision member 50 may be generated more properly (improving pedestrian protection performance).

Supplementary Descriptions of Exemplary Embodiments

Now, in the exemplary embodiment described above, at the hood inner panel 18, the crush beads 24 are formed along the hood width direction at a predetermined position of the skeleton portion 20, and the small beads 28 which are protrusions that serve as reinforcement portions are formed at predetermined positions of the flat portion 26, and this structure is more preferable. However, for example, a structure is possible in which crush beads and small beads (reinforcement portions) are formed at a hood inner panel.

Further, in the exemplary embodiment described above, the small beads 28 are formed to protrude to the hood lower side, and two of the small beads 28 are formed at the hood width direction substantially central portion of the flat portion 26 of the hood inner panel 18. However, reinforcement portions may be, for example, reinforcement portions that are protrusions to the hood upper side. Moreover, one or three or more thereof may be formed at a hood width direction substantially central portion of the flat portion 26.

Further, in the exemplary embodiment described above, the small beads 28 serving as reinforcement portions are formed along the hood length direction, and this structure is more preferable. However, the reinforcement portions may be other reinforcement portions such as, for example, reinforcement portions that are formed along a direction that is an angled direction relative to the hood length direction, or the like.

Further, in the exemplary embodiment described above, the legs 48 are formed at the hood width direction central portion and the hood width direction two end portion sides of the hood lock reinforce 40, and this structure is more preferable. However, legs may be formed, for example, one each at the two width direction sides of the hood width direction of the hood lock reinforce, somewhat closer to the central portion, or the like, they may be formed at other positions, and the number that are formed may be a number other than three.

Further yet, in the exemplary embodiment described above, the front ends of the reinforcement beads 22 are disposed to be separated to the hood back side in the hood length direction from the rear ends of the legs 48, and this structure is more preferable. However, for example, a hood length direction position of the front ends of the reinforcement beads may be aligned in the hood length direction with a hood length direction position of the rear ends of the legs.

Herein, in the exemplary embodiment described above, the weakened portion 44 is structured by forming the inflecting portion 44A and the long hole 44B at the standing wall portion 40C of the hood lock reinforce 40. However, the weakened portion may be another weakened portion such as, for example, a weakened portion that is only the inflecting portion (44A), a weakened portion in which only penetrating holes or recess portions in a standing wall portion (40C) are formed, or the like.

The whole of the disclosure of Japanese Patent Application No. 2008-024152 is incorporated by reference in the present specification.

EXPLANATION OF REFERENCE NUMERALS

12 Engine compartment
14 Hood
14B Hood front end portion
16 Hood outer panel
18 Hood inner panel
20 Skeleton portion
22 Reinforcement bead
24 Crush bead
26 Flat portion
28 Small bead (reinforcement portion)
40 Hood lock reinforce
40D Rear end portion of hood lock reinforce
44 Weakened portion
48 Leg

The invention claimed is:

1. A vehicular hood structure comprising:
a hood outer panel that structures an outer plate of a hood that openably covers an engine compartment;
a hood inner panel that is disposed at a hood lower side relative to the hood outer panel and structures an inner plate of the hood, and that is provided with
a skeleton portion at which a plurality of reinforcement beads are formed in a central region excluding outer peripheral end portions, and
a flat portion extending in a hood width direction adjacent to a hood front side of the skeleton portion; and
a hood lock reinforce that is disposed between the hood outer panel and the hood inner panel to serve for reinforcement at a hood front end portion and extends in the hood width direction, and that is provided with
a lower wall portion that includes a portion at which a striker is fixed and that is disposed at the hood inner panel side,
a standing wall portion that rises diagonally upward toward the hood back from a rear end in a hood length direction of the lower wall portion and at which a weakened portion is provided, the weakened portion deforming at a time of input of a load of a predetermined value or greater from a hood upper side,
a rear end portion that is provided continuously with the hood back side of the standing wall portion and that is joined to the hood outer panel, and
legs that extend to the hood back side at portions of the rear end portion spaced at a predetermined distance in the hood width direction and that are joined to the flat portion.

2. The vehicular hood structure according to claim 1, wherein, at the hood inner panel, a crush bead is formed along the hood width direction at a substantially central portion of the skeleton portion in a hood length direction, and a reinforcement portion that is a protrusion to the hood lower side or the hood upper side is formed at a substantially central portion of the flat portion in the hood width direction.

3. The vehicular hood structure according to claim 2, wherein the reinforcement portion is formed along the hood length direction.

4. The vehicular hood structure according to claim 1, wherein the legs are formed at a hood width direction central portion and two hood width direction end portion sides of the hood lock reinforce.

5. The vehicular hood structure according to claim 1, wherein the reinforcement beads are spaced at a predetermined distance in the hood width direction and are formed substantially along the hood length direction, and front ends of the reinforcement beads are disposed to be separated in the hood length direction from rear ends of the legs.

6. The vehicular hood structure according to claim 2, wherein the legs are formed at a hood width direction central portion and two hood width direction end portion sides of the hood lock reinforce.

7. The vehicular hood structure according to claim 3, wherein the legs are formed at a hood width direction central portion and two hood width direction end portion sides of the hood lock reinforce.

8. The vehicular hood structure according to claim 2, wherein the reinforcement beads are spaced at a predetermined distance in the hood width direction and are formed substantially along the hood length direction, and front ends of the reinforcement beads are disposed to be separated in the hood length direction from rear ends of the legs.

9. The vehicular hood structure according to claim 3, wherein the reinforcement beads are spaced at a predetermined distance in the hood width direction and are formed substantially along the hood length direction, and front ends of the reinforcement beads are disposed to be separated in the hood length direction from rear ends of the legs.

10. The vehicular hood structure according to claim 4, wherein the reinforcement beads are spaced at a predetermined distance in the hood width direction and are formed substantially along the hood length direction, and front ends of the reinforcement beads are disposed to be separated in the hood length direction from rear ends of the legs.

11. The vehicular hood structure according to claim 6, wherein the reinforcement beads are spaced at a predetermined distance in the hood width direction and are formed substantially along the hood length direction, and front ends of the reinforcement beads are disposed to be separated in the hood length direction from rear ends of the legs.

12. The vehicular hood structure according to claim 7, wherein the reinforcement beads are spaced at a predetermined distance in the hood width direction and are formed substantially along the hood length direction, and front ends of the reinforcement beads are disposed to be separated in the hood length direction from rear ends of the legs.

* * * * *